United States Patent

Klee et al.

Patent Number: 6,125,027

Date of Patent: *Sep. 26, 2000

[54] COMPONENT COMPRISING A CAPACITOR

[75] Inventors: Mareike Klee, Hückelhoven-Brachelen; Wolfgang Brand, Aachen; Wilhelm Hermann, Roetgen, all of Germany; Mathieu J. E. Ulenaers, Bree, Belgium; Gijsbertus A. C. M. Spierings, Boxtel; Hendrikus J. J. M. Van Haren, Nuenen, both of Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,143

[22] Filed: Jul. 30, 1997

[30] Foreign Application Priority Data

Jul. 31, 1996 [DE] Germany ............................ 196 30 883

[51] Int. Cl.[7] ............................. H01G 4/08; H01G 4/228
[52] U.S. Cl. ................... 361/320; 361/321.5; 361/321.4; 361/306.1; 361/308.1; 361/310
[58] Field of Search ................................ 361/301.1, 303, 361/305, 306.1, 308.1, 311, 321.1, 321.2, 312, 313, 320, 306.3, 321.3, 321.4

[56] References Cited

U.S. PATENT DOCUMENTS

| | | | |
|---|---|---|---|
| 3,566,204 | 2/1971 | Callahan | 317/230 |
| 4,424,615 | 1/1984 | Wakino | 26/25.42 |
| 4,453,199 | 6/1984 | Ritchie et al. | 361/306 |
| 4,654,095 | 3/1987 | Steinberg | 156/89 |
| 4,766,027 | 8/1988 | Burn | 428/210 |
| 4,772,985 | 9/1988 | Yasumoto et al. | 361/321 |
| 4,835,656 | 5/1989 | Kitahara et al. | 361/321 |
| 4,855,266 | 8/1989 | Burn | 501/138 |
| 4,868,711 | 9/1989 | Hirama et al. | 361/321 |
| 5,005,102 | 4/1991 | Larson | 361/313 |
| 5,046,043 | 9/1991 | Miller et al. | 365/145 |
| 5,133,036 | 7/1992 | Törnqvist | . |
| 5,258,335 | 11/1993 | Muralidar et al. | 501/20 |
| 5,258,886 | 11/1993 | Murayama et al. | 361/321.5 |
| 5,342,648 | 8/1994 | Macemzie et al. | 427/126.3 |
| 5,418,388 | 5/1995 | Okudaira | 257/295 |
| 5,605,858 | 2/1997 | Nishioka et al. | 437/60 |
| 5,612,560 | 3/1997 | Chivukula et al. | 257/309 |
| 5,617,290 | 4/1997 | Kulwicki et al. | 361/321.4 |
| 5,624,707 | 4/1997 | Azuma et al. | 438/240 |
| 5,723,361 | 3/1998 | Azuma et al. | 437/180 |
| 5,790,366 | 8/1998 | Desu et al. | 361/305 |
| 5,812,363 | 9/1998 | Kuroda et al. | 361/306.3 |
| 5,814,849 | 9/1998 | Azuma et al. | 257/296 |
| 5,822,175 | 10/1998 | Azuma | 361/321.5 |
| 5,835,339 | 11/1998 | Sakamoto et al. | 361/321.2 |
| 5,835,340 | 11/1998 | Wada et al. | 361/321.5 |
| 5,851,896 | 12/1998 | Summerfelt | 429/79 |

FOREIGN PATENT DOCUMENTS

3414808A1  12/1984  Germany  ........................ H01G 4/30

OTHER PUBLICATIONS

Buchmanan, "Ceramic Materials for Electronics", 2nd edition pp. 4–7, 1991.

*Primary Examiner*—Dean A. Reichard
*Assistant Examiner*—Eric Thomas

[57] ABSTRACT

A component includes a substrate layer (1) of glass or $Al_2O_3$, an anti-reaction layer (2) or a levelling layer (2), two electrode layers (3, 5) and a dielectric layer (4) as well as such a capacitor. Manufacture a component which provides for cost-effective, surface-mountable (SMD). The anti-reaction layer (2) on the glass substrate (1) or the levelling layer (2) on the $Al_2O_3$-substrate (1) is made of at least one specific material. An anti-reaction layer or a levelling layer (2) of one of the above-mentioned substances or a combination of several substances, enables a dielectric layer (4) to be provided by means of which a high capacitance value is achieved.

11 Claims, 1 Drawing Sheet

COMPONENT COMPRISING A CAPACITOR

BACKGROUND OF THE INVENTION

The invention relates to a component comprising a capacitor, in particular an integrated or discrete structural element, which component includes at least a substrate layer of glass or $Al_2O_3$, at least an anti-reaction layer or a levelling layer, at least two electrode layers and at least a dielectric layer as well as such a capacitor.

The invention further relates to a method of manufacturing such a component having a capacitor and comprising a glass substrate and an anti-reaction layer or an $Al_2O_3$-substrate and a levelling layer.

Ceramic multilayer capacitors are customarily manufactured by means of powder technology. For this purpose, powders are prepared by means of mixed-oxide methods or wet-chemical methods, such as precipitation from aqueous solutions. The powders having a desired composition are provided with a binder and processed to form, for example, foils. The foils are printed with electrode pastes and, subsequently, stacked. The binder is burned out at low temperatures and the capacitors are sintered into a dense product at temperatures which, depending on the material system and the composition, range from approximately 1250° C. to 1300° C. Ceramic capacitors manufactured by means of prior-art methods comprise dielectric layers having thicknesses of approximately 10 to 15 $\mu$m. Progress in powder technology enables capacitors with dielectric layer thicknesses of approximately 3 to 5 $\mu$m to be produced.

Owing to the foil and screen-printing technologies used as well as to the stacks of foils comprising up to 70–100 layers, a miniaturization of the external dimensions requires a very high technical expenditure for capacitor dimensions 0402 and 0201, which correspond to 1·0.5 $mm^2$ and 0.5·0.25 $mm^2$, respectively. Capacitors manufactured in accordance with the prior art typically exhibit leakage paths of approximately 150–250 $\mu$m. Consequently, a capacitor having lateral dimensions of 0402 or 0201 only has a small active capacitor surface.

DE 34 14 808 to which U.S. Pat. No. 4,453,199 corresponds discloses that a substrate, preferably a glass plate, is provided with a layer of a phosphor-enriched silicon-dioxide base containing approximately 3% phosphor. This layer is provided with a layer to be structured of a conductive material, preferably aluminium or nickel, to define electrodes. The substrate thus treated is then coated with a layer of silicon dioxide having a dielectric constant K=3.97 and a thickness of 1.155 $\mu$m. DE 34 14 808 describes thin-film capacitors having a very low surface capacitance. For the substrate use is made of glass, and for the electrode material use is made of aluminium. Under these conditions, only a single oxidic layer, such as the indicated $SiO_2$ layer, can be used as a dielectric layer. These layers have a very low dielectric constant K and hence also yield very low surface capacitances. Using these dielectric layers, only capacitors with 100–500 pF can be produced. To achieve high capacitances, it is necessary to deposit a dielectric material with K>50 in the form of thin layers on a substrate.

SUMMARY OF THE INVENTION

Therefore, it is an object of the invention to manufacture cost-effective, surface-mountable (SMD) capacitors having a high surface capacitance, a small thickness and a low tolerance.

In accordance with the invention, a component having a capacitor and a glass substrate comprises, as the material for the anti-reaction layer, at least an element of a group composed of $TiO_2$, $ZrO_2$, $HfO_2$, $SrTiO_3$, $CaTiO_3$, $BaTiO_3$, $BaZr_xTi_{1-x}O_3$ with x=0 ... 1, $PbZr_xTi_{1-x}O_3$ with x=0 ... 1, $Ta_2O_5$, $Nb_2O_5$, MgO, BeO, $Al_2O_3$, $MgAl_2O_4$, $ZrTiO_4$, $BaF_2$, $TiB_2$, $MgF_2$, $Y_2O_3$, $Sc_2O_3$, $La_2O_3$ and $Ln_2O_3$, Ln being lanthanides, such as $Pr_2O_3$. Particularly for saving costs, the glass substrate can be made of silicate glasses instead of quartz glass ($SiO_2$). To attain high capacitances within small dimensions, it is necessary to employ dielectric materials having dielectric constants K>10, from which thin dielectric layers having sufficiently high capacitances are manufactured by means of thin-film processes. These materials can only be used on a cost-effective glass substrate if an anti-reaction layer is provided which precludes a reaction between the dielectric material and the glass substrate. In addition, the anti-reaction layer also precludes the formation of cracks as a result of differences in the coefficients of thermal expansion of the substrate and the dielectric layer. If the glass substrate is provided with an anti-reaction layer of one of the above-mentioned substances, or a combination of several substances, said anti-reaction layer can be provided with a dielectric layer which enables a sufficiently high capacitance to be achieved. A suitable method of depositing an anti-reaction layer also includes the provision of a composite layer, such as a Ti/Pt layer, followed by the structuring of the Pt by means of reactive ion etching and, subsequently, oxidation of Ti in an oxygen atmosphere to form $TiO_2$.

In a preferred embodiment of the invention, the material used for the electrode layers is at least one element of a group consisting of Ti/Pt, Ta/Pt, Ti/Pd/Pt, Ir, $IrO_2$, $Ir_2O_3$, $IrO_2$/Ir, $ZrO_2$/Pt, Ti/Cu, Ti/Ni, Ti/NiAl, Ti/(Ni, Al, Cr), Ti/(Ni, Al, Fe), Ti/(Ni, Fe, Cr), Ti/(Ni, Al, Cr, Fe), Ti/(Ni, Fe, Cr, Si), Ti/(Co, Ni, Fe, Cr), $Pt_xAl_{1-x}$/Pt, Pt/$IrO_2$, $TiO_2$/Pt, conductive oxides, hybrids of at least a conductive oxide and a noble metal, and hybrids of at least a noble metal and a base metal. For the electrode material use is made of noble-metal layers or base-metal layers, which are structured so as to form electrodes, for example, by means of lithographic processes in combination with wet-etching or dry-etching steps. For the conductive oxides use can be made, for example, of the compounds $RuO_x$, $SrRuO_3$, or other compounds. For hybrid combinations of conductive oxides and noble metals, use can be made, for example, of combinations such as $RuO_x$/Pt. Particularly the combinations Ti/Cu/Pt, Ti/Ni/Pt and Ti/(Ni, Cr, Al, Fe)/Pt as well as similar compounds can suitably be used as the hybrid electrodes of noble metal and base metal.

In an advantageous further embodiment of the component, a layer of a ferroelectric material having a thickness in the range from 10 nm to 2 $\mu$m is used as the dielectric layer. Since the anti-reaction layers enable thin, ferroelectric dielectric layers having a low loss factor to be applied to a substrate in a cost-effective manner, it is possible to manufacture a capacitor having a large volume capacitance by means of the thin-film technology, which capacitor is surface-mountable (SMD) and can be very accurately produced. For thin layers in the range from 10 nm to 2 $\mu$m, use is preferably made of the following dielectric materials:

$PbZr_xTi_{1-x}O_3$, wherein x=0–1, with or without an excess of lead

Doped $PbZr_xTi_{1-x}O_3$, for example doped with Nb $Pb_{1-\alpha y}La_yZr_xTi_{1-x}O_3$, wherein x=0–1, y=0–0.20 and $\alpha$=1.3–1.5, with or without an excess of lead $Pb_{1-\alpha y}La_yTiO_3$, wherein y=0–0.28 and $\alpha$=1.3–1.5, with or without an excess of lead (Pb, Ca)$TiO_3$ $BaTiO_3$, with or without dopants
$BaTiO_3$ doped with Ce
$BaTiO_3$ doped with Nb and/or Co
$BaZr_xTi_{1-x}O_3$, wherein x=0–1
$Ba_{1-x}Sr_xTiO_3$, wherein x=0–1
$SrTiO_3$ doped, for example, with La, Nb, Fe, Mn
$SrZr_xTi_{1-x}O_3$, wherein x=0–1, with or without an Mn dopant
$CaO_xZnO_y(Nb_2O_5)_z$, wherein x=0.01–0.05; y=0.43–0.55; z=0.44–0.52
$(BaTiO_3)_{0.18-0.27}+(Nd_2O_3)_{0.316-0.355}+(TiO_2)_{0.276-0.355}+(Bi_2O_3)_{0.025-0.081}+ZnO$
$MgO$—$TiO_2$—$CaO$—$Al_2O_3$—$SiO_2$ doped with Nb, Y, La, Pr, Ni
$Al_2O_3$
$Ba_2Ti_9O_{20}$
$Nb_2O_5$
$TiO_2$
$CaTiO_3$
$CaTiO_3+CaTiSiO_5$
$(Sr, Ca)(Ti, Zr)O_3$
$(Sr, Ca, M)(Ti, Zr)O_3$ M=Mg or Zn
$(Sr, Ca, Mg, Zn)(Ti, Zr, Si)O_3$
$(Sr, Ca, Cu, Mn, Pb)TiO_3+Bi_2O_3$
$BaO$—$SrO$—$CaO$—$Nd_2O_3$—$Gd_2O_3$—$Nb_2O_5$—$TiO_2$
$(Bi_2O_3)_x(Nb_2O_5)_{1-x}$ with additives of $SiO_2$, $MnO_2$, PbO
$BaTiO_3$ doped with $Nb_2O_5$, CoO, $MnO_2$, $CeO_2$, ZnO
$BaTiO_3+CaZrO_3$ with additives of MnO, MgO and rare earth oxides
$(Ba, Ca)TiO_3+Nb_2O_5$, $Co_2O_3$, $MnO_2$
$Zr(Ti, Sn)O_4$
$BaO$—$PbO$—$Nd_2O_3$—$Pr_2O_3$—$Bi_2O_3$—$TiO_2$
$Ba(Zn, Ta)O_3$
$Ta_2O_5$
$CaZrO_3$
$(Ba, Nd)(Ti, Zr)O_3+Ce$-dopant
$(Ba, Ca, Sr)(Ti, Zr)O_3+Li_2O$, $SiO_2$, $B_2O_3$
$PbO$—$Nb_2O_3$—$ZrO_2$—$SnO_2$—$TiO_2$
$[Pb(Mg_{1/3}Nb_{2/3})O_3]_x$—$[PbTiO_3]_{1-x}$, wherein x=0 . . . 1, with and without an excess of lead, with and without dopant
$(Pb, Ba, Sr)(Mg_{1/3}Nb_{2/3})_xTi_y(Zn_{1/3}Nb_{2/3})_{1-x-y}O_3$ i) $Pb(Mg_{1/2}W_{1/2})O_3$
ii) $Pb(Fe_{1/2}Nb_{1/2})O_3$
iii) $Pb(Fe_{2/3}W_{1/3})O_3$
iv) $Pb(Ni_{1/3}Nb_{2/3})O_3$
v) $Pb(Zn_{1/3}Nb_{2/3})O_3$ combinations of the compounds i)–v) with $PbTiO_3$ and $Pb(Mg_{1/3}Nb_{2/3})O_3$ $Pb(Sc_{1/2}Ta_{1/2})O_3$ It is alternatively possible to use layer structures which are composed of several individual layers of the above-mentioned compounds, such as a PZT-layer having a high titanium content on which PLZT-layers are provided, which results, in particular, in an improvement of the electrical properties of the layer.

In accordance with the invention a component having a capacitor and at least a substrate layer of $Al_2O_3$ comprises, as the material for the levelling layer, non-crystallizing glasses consisting of at least one element of a group composed of $TiO_2$, $ZrO_2$, $HfO_2$, $SrTiO_3$, $CaTiO_3$, $CaZrO_3$, $BaTiO_3$, $BaZr_xTi_{1-x}O_3$, wherein x=0 . . . 1, $PbZr_xTi_{1-x}O_3$, wherein x=0 . . . 1, $Ta_2O_5$, $Nb_2O_5$, MgO, BeO, $Al_2O_3$, $MgAl_2O_4$, $ZrTiO_4$, $BaF_2$, $MgF_2$, $Y_2O_3$, $Sc_2O_3$, $La_2O_3$ and $Ln_2O_3$, Ln being lanthanides, such as $Pr_2O_3$. In analogy with an inventive capacitor comprising a glass substrate and an anti-reaction layer, use is made here of dielectric materials having dielectric constants K>10 to obtain high capacitances within small dimensions. To use these materials on a cost-effective $Al_2O_3$-substrate, it is necessary to provide a levelling layer, since not only a reaction of the dielectric layer with $Al_2O_3$ must be prevented but also short-circuits of the capacitors caused by the high surface roughness. In addition, the formation of cracks in the dielectric layer caused by differences between the coefficients of thermal expansion are avoided. If the $Al_2O_3$-substrate is provided with a levelling layer of one of the above-mentioned substances or a combination of several substances, the levelling layer can be provided with a dielectric layer enabling a sufficiently high capacitance to be achieved. In the case of substrates having a very high surface roughness, for example $Al_2O_3$-substrates of thick-film quality, the levelling layers provided have a thickness of several micrometers. This levelling layer may be, for example, a lead-silicate-glass layer or, to increase the temperature stability, a glass layer enriched with $TiO_2$, $ZrO_2$ or also $PbTiO_3$ or any one of the above-mentioned additives. To deposit layers having a thickness of several micrometers use can be made, for example, of thick-film processes such as screen-printing processes.

In a preferred embodiment of the inventive capacitor having an $Al_2O_3$-substrate, the material for the electrode layers is at least one element of a group consisting of Ti/Pt, Ta/Pt, Ti/Pd/Pt, Ir, $IrO_2$, $Ir_2O_3$, $IrO_2$/Ir, $ZrO_2$/Pt, Ti/Cu, Ti/Ni, Ti/NiAl, Ti/(Ni, Al, Cr), Ti/(Ni, Al, Fe), Ti/(Ni, Fe, Cr), Ti/(Ni, Al, Cr, Fe), Ti/(Ni, Fe, Cr, Si), Ti/(Co, Ni, Fe, Cr), $Pt_xAl_{1-x}$/Pt, $Pt/IrO_2$, $TiO_2$/Pt, conductive oxides, hybrids of at least a conductive oxide and a noble metal, and hybrids of at least a noble metal and a base metal. For the conductive oxides use can be made, for example, of the compounds $RuO_x$, $SrRuO_3$ or other compounds. For hybrid combinations of conductive oxides and noble metals use can be made, for example, of combinations such as $RuO_x$/Pt. In particular the combinations Ti/Cu/Pt, Ti/Ni/Pt and Ti/(Ni, Cr, Al, Fe)/Pt as well as similar compounds can be used as the hybrid electrodes of noble metal and base metal.

In an advantageous further embodiment of the invention, the dielectric layer is one layer of a ferroelectric material having a thickness in the range from 10 nm to 2 $\mu$m. Also in this case, levelling layers can be used to enable thin, ferroelectric dielectric layers having a low loss factor to be applied to a cost-effective substrate, which dielectric layers make it possible to manufacture a capacitor having a high volume capacitance by means of thin-film technology, which capacitor is surface-mountable (SMD) and can be manufactured with great accuracy. For the dielectric materials use is preferably made of the substances mentioned hereinabove, which were applied to a glass substrate in layer thicknesses ranging from 10 nm to 2 $\mu$m.

In another embodiment of the capacitor, manufactured by means of thickfilm technology, however, the material for the electrode layers is at least one metal powder in the form of a paste of a group composed of $Ag_xPt_{1-x}$, wherein x=0 . . . 1, $Ag_xPd_{1-x}$, wherein x=0 . . . 1, Ag, Cu, Ni, with small quantities of an adhesive glass being added to each of said metal powders.

Apart from the thin-film embodiment on an $Al_2O_3$-substrate, it may also be advantageous to use, for the dielectric layer, a layer of a ferroelectric material having a thickness in the range from 2 $\mu$m to 20 $\mu$m. For layer thicknesses in the range from approximately 2 $\mu$m to 20 $\mu$m, preferably, pastes are used as the dielectric materials, comprising the following constituents in powder form:

$PbZr_xTi_{1-x}O_3$, wherein x=0–1, with or without an excess of lead (for example $PbWO_3$)
Doped $PbZr_xTi_{1-x}O_3$ with a liquid phase
$Pb_{1-\alpha y}La_yZr_xTi_{1-x}O_3$, wherein x=0–1, y=0–0.20 and $\alpha$=1.3–1.5

$Pb_{1-\alpha y}La_yTiO_3$, wherein y=0–0.28 and α=1.3–1.5
(Pb, Ca)TiO$_3$
BaTiO$_3$
BaTiO$_3$ doped with Ce
BaTiO$_3$ with or without Nb and/or Co dopants
$BaZr_xTi_{1-x}O_3$, wherein x=0–1
$Ba_{1-x}Sr_xTiO_3$, wherein x=0–1
SrTiO$_3$ doped, for example, with La, Nb, Fe, Mn
$SrZr_xTi_{1-x}O_3$, wherein x=0–1, with or without an Mn dopant
$CaO_xZnO_y(Nb_2O_5)_z$, wherein x=0.01–0.05; y=0.43–0.55; z=0.44–0.52
$(BaTiO_3)_{0.18-0.27}+(Nd_2O_3)_{0.316-0.355}+(TiO_2)_{0.276-0.355}+(Bi_2O_3)_{0.025-0.081}+ZnO$
CaTiO$_3$+CaTiSiO$_5$
(Sr, Ca)(Ti, Zr)O$_3$
(Sr, Ca, M)(Ti, Zr)O$_3$ M=Mg or Zn
(Sr, Ca, Mg, Zn)(Ti, Zr, Si)O$_3$
(Sr, Ca, Cu, Mn, Pb)TiO$_3$+Bi$_2$O$_3$
BaO—SrO—CaO—Nd$_2$O$_3$—Gd$_2$O$_3$—Nb$_2$O$_5$—TiO$_2$
$(Bi_2O_3)_x(Nb_2O_5)_{1-x}$ with additives of SiO$_2$, MnO$_2$, PbO
BaTiO$_3$ doped with Nb$_2$O$_5$, CoO, MnO$_2$, CeO$_2$, ZnO
BaTiO$_3$+CaZrO$_3$ with additives of MnO, MgO and rare earth oxides
(Ba, Ca)TiO$_3$+Nb$_2$O$_5$, Co$_2$O$_3$, MnO$_2$
MgO—TiO$_2$—CaO—Al$_2$O$_3$—SiO$_2$ doped with Nb, Y, La, Pr, Ni
Ba$_2$Ti$_9$O$_{20}$
Zr(Ti, Sn)O$_4$
BaO—PbO—Nd$_2$O$_3$—Pr$_2$O$_3$—Bi$_2$O$_3$—TiO$_2$
Ba(Zn, Ta)O$_3$
(Ba, Nd)(Ti, Zr)O$_3$+Ce-dopants
CaZrO$_3$
(Ba, Ca, Sr)(Ti, Zr)O$_3$+Li$_2$O, SiO$_2$, B$_2$O$_3$
PbO—Nb$_2$O$_3$—ZrO$_2$—SnO$_2$—TiO$_2$
$[Pb(Mg_{1/3}Nb_{2/3})O_3]_x$—$[PbTiO_3]_{1-x}$+liquid phase, wherein x=0 . . . 1
$(Pb, Ba, Sr)(Mg_{1/3}Nb_{2/3})_xTi_y(Zn_{1/3}Nb_{2/3})_{1-x-y}O_3$
  i) Pb(Mg$_{1/2}$W$_{1/2}$)O$_3$
  ii) Pb(Fe$_{1/2}$Nb$_{1/2}$)O$_3$
  iii) Pb(Fe$_{2/3}$W$_{1/3}$)O$_3$
  iv) Pb(Ni$_{1/3}$Nb$_{2/3}$)O$_3$
  v) Pb(Zn$_{1/3}$Nb$_{2/3}$)O$_3$
combinations of the compounds i)–v) with
  PbTiO$_3$ and Pb(Mg$_{1/3}$Nb$_{2/3}$)O$_3$+liquid phase
Pb(Sc$_{1/2}$Ta$_{1/2}$)O$_3$
$[Pb(Mg_{1/3}Nb_{2/3})O_3]_x$—$[PbTiO_3]_{1-x}$ with PbWO$_3$ as the liquid phase and x=0 . . . 1.

Further, pastes which are particularly suitable are those which contain the above-mentioned constituents in powder form and to which glasses or an inorganic binder in the form of a gel is admixed to reduce the process temperature.

Advantageously, in the embodiments of the component, at least an organic or inorganic protective layer is provided. Particularly suitable protective layers, which provide protection, for example, against mechanical stresses, are polymeric protective layers or inorganic protective layers or combinations of polymeric and inorganic protective layers, such as SiO$_2$+polyimide. The component comprising a capacitor may alternatively be constructed so that a further substrate, for example a glass substrate, is adhered to the inorganic or polymeric protective layer.

Further, preferably at least two end contacts are provided. At the location of the end contacts, the component can be electrically coupled to external components. Depending on the application, it may be advantageous to use differently constructed end contacts. Consequently, apart from the conventional end contacts, in which 5 surfaces are contacted, other embodiments are possible which are more suitable for specific applications or for specific methods of mounting the component. Use can be made, for example, of the following end contacts:

a) SMD-end contacts having fewer than 5 contact faces, b) end contacts consisting of 3 faces forming a U-shaped contact, c) end contacts consisting of 2 faces forming an L-shaped contact, d) SMD-end contacts with 5 or fewer contact faces, with both the upper and the lower electrode layer being contacted from above.

The object of the invention is further achieved by a method of manufacturing a component comprising a capacitor, this method comprising the following steps making at least a glass substrate layer available, applying at least an anti-reaction layer to the substrate layer, applying at least an electrode layer to the anti-reaction layer, structuring the first electrode layer to form at least a first electrode, providing at least a dielectric layer on the first electrode, providing at least a second electrode layer on the dielectric layer, structuring the second electrode layer to form at least a second electrode, in which method, the material used for the anti-reaction layer is at least one element of a group composed of TiO$_2$, ZrO$_2$, HfO$_2$, SrTiO$_3$, CaTiO$_3$, BaTiO$_3$, $BaZr_xTi_{1-x}O_3$, wherein x=0 . . . 1, $PbZr_xTi_{1-x}O_3$, wherein x=0 . . . 1, Ta$_2$O$_5$, Nb$_2$O$_5$, MgO, BeO, Al$_2$O$_3$, MgAl$_2$O$_4$, ZrTiO$_4$, BaF$_2$, MgF$_2$, Y$_2$O$_3$, Sc$_2$O$_3$, La$_2$O$_3$ and Ln$_2$O$_3$, Ln being lanthanides, such as Pr$_2$O$_3$. To manufacture the dielectric layer use can suitably be made, in particular, of the following deposition methods: sputtering, electron-beam evaporation, laser-ablation, chemical deposition from the gas phase or wet-chemical methods, such as the sol-gel method. To manufacture the anti-reaction layer use can advantageously be made of the following deposition methods: wet-chemical methods, such as centrifuging, dip-coating, spraying or sputtering, chemical deposition from the gas phase or laser-ablation.

The object of the invention is also achieved by a method of manufacturing a component comprising a capacitor, which method includes the following steps:

making at least a substrate layer of Al$_2$O$_3$ available, applying at least a levelling layer to the substrate layer, applying at least a first electrode layer to the levelling layer, structuring the first electrode layer to form at least a first electrode, providing at least a dielectric layer on the first electrode, providing at least a second electrode layer on the dielectric layer, structuring the second electrode layer to form at least a second electrode, in which method the material used for the levelling layer comprises non-crystallizing glasses consisting of at least one element of a group composed of TiO$_2$, ZrO$_2$, HfO$_2$, SrTiO$_3$, CaTiO$_3$, BaTiO$_3$, $BaZr_xTi_{1-x}O_3$, wherein x=0 . . . 1, $PbZr_xTi_{1-x}O_3$, wherein x=0 . . . 1, Ta$_2$O$_5$, Nb$_2$O$_5$, MgO, BeO, Al$_2$O$_3$, MgAl$_2$O$_4$, ZrTiO$_4$, BaF$_2$, MgF$_2$, Y$_2$O$_3$, Sc$_2$O$_3$, $La_2O_3$ and $Ln_2O_3$, Ln being lanthanides such as $Pr_2O_3$. In this case, the deposition method used to manufacture the dielectric layer is preferably a printing method such as screen printing, flexographic printing, centrifuging, dip-coating, doctor blade coating or curtain coating. The levelling layer is preferably deposited by means of methods, for example a printing method, such as screen printing, flexographic printing, or by centrifuging, dip-coating, doctor blade coating or curtain coating.

As, in general, these products are mass products for use in consumer products, it is necessary to employ very cost-effective manufacturing methods. An example of a very cost-effective method of depositing thin, dielectric layers having a capacitance value of K>10 is a wet-chemical thin-film method, such as the sol-gel method. Said method enables, for example, $PbZr_xTi_{1-x}O_3$-layers to be produced in the form of ceramic layers at temperatures ranging from 400 to 700° C. These process temperatures are 500 to 600° C. lower than the corresponding temperatures employed during the manufacture of dense ceramic $PbZr_xTi_{1-x}O_3$-sintered bodies. The use of these methods, such as wet-chemical methods, enables the layers to be deposited in thicknesses up to 10 nm at low temperatures. These low temperatures are necessary to produce the very thin layers on cost-effective substrates, such as glass substrates or $Al_2O_3$-substrates. To manufacture very thin capacitors, use is made of thin substrate plates having thicknesses in the range from approximately 200 to 500 µm.

These and other aspects of the invention will be apparent from and elucidated with reference to the embodiments described hereinafter.

DETAILED DESCRIPTION OF THE PREFERRED EMBODIMENTS

Figure 1:
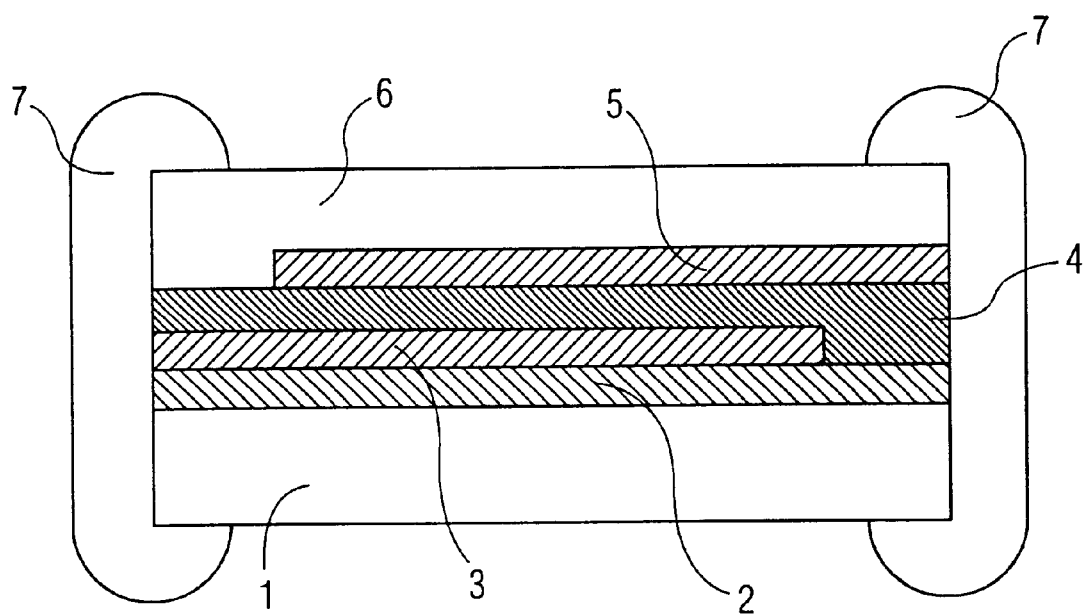
FIG. 1 is a schematic, cross-sectional view of the structure of the component in accordance with the invention.

In the component shown in FIG. 1, reference numeral 1 refers to a substrate layer, for example glass or $Al_2O_3$, reference numeral 2 refers to an anti-reaction layer or a levelling layer, reference numeral 3 refers to a first electrode, reference numeral 4 refers to a dielectric layer, reference numeral 5 refers to a second electrode, reference numeral 6 refers to a protective layer and reference numeral 7 refers to two end contacts which are provided on two sides of the component. Apart from the conventional end contacts, in which five faces of the component are contacted, other embodiments are possible.

Hereinbelow, exemplary embodiments of the invention will be explained. Within the scope of the invention many variations are possible to those skilled in the art.

EXAMPLE 1

A thin Ti-layer 2 is sputtered onto a glass substrate 1 (Corning 7059) and, subsequently, oxidized. Next, a Ti/Pt-layer 3 is provided by sputtering. This electrode layer is structured by sputtering through a mechanical mask. A $PbZr_{0.35}Ti_{0.65}O_3$-layer 4 is applied to this substrate. The $PbZr_{0.35}Ti_{0.65}O_3$-layer 4 is deposited by using a solution in which lead-acetate-tri-hydrate has been dissolved in 60 g of ethylene glycol monomethylether. A quantity of 8.62 g of titanium-tetra-n-butylate and 7.51 g of zirconium-tetra-n-butylate are added to this solution. The solution was passed through a cellulose-acetate filter having a pore size of 0.2 µm. To deposit a PZT-layer 4, a glass substrate 1 with a structured Pt-electrode 3 is used. This substrate is provided with approximately 1 ml of the Pb—Ti—Zr-solution, which is made into a coating by means of a centrifuging process at 2500 revolutions per minute. This coating is heated to 550° C. at a rate of 100° C./second in an oxygen atmosphere and, subsequently, sintered at this temperature. This process is repeated several times to form a layer 4 having a thickness of approximately 0.3–1 µm. A second Pt-electrode 5 is sputtered onto this PZT-layer 4 through a mechanical mask. After the deposition of a 0.5 µm thick $SiO_2$-layer and an organic protective layer 6, the substrates are subdivided into strips and then provided with end contacts 7.

EXAMPLE 2

A thin Ti-layer 2 is sputtered onto a glass substrate 1 (Schott AF45) and thermally oxidized. Subsequently, a Ti/Pt-layer 3 is provided by sputtering. This electrode is structured by means of reactive ion etching. A $PbZr_{0.35}Ti_{0.65}O_3$-layer 4 is provided on this substrate. The $PbZr_{0.35}Ti_{0.65}O_3$-layer 4 is deposited by using a solution in which lead-acetate-tri-hydrate has been dissolved in 60 g of ethylene glycol monomethylether. A quantity of 8.62 g titanium-tetra-n-butylate and 7.51 g of zirconium-tetra-n-butylate are added to this solution. The solution is passed through a cellulose-acetate filter having a pore size of 0.2 µm. To deposit a PZT-layer 4, use is made of the glass substrate 1 with the structured Pt-electrode 3. This substrate is provided with approximately 1 ml of the Pb—Ti—Zr-solution, which is made into a coating by means of a centrifuging process at 2500 revolutions per minute. The coating is heated to 550° C. at a rate of 100° C./second in an oxygen atmosphere and, subsequently, sintered at this temperature. This process is repeated several times to produce a layer having a thickness of approximately 0.2–1 µm. A Pt-electrode 5 is sputtered onto this PZT-layer 4 and structured by means of reactive ion etching. The further processing steps necessary to form a capacitor component are carried out as described in example 1.

EXAMPLE 3

A thin Ti-layer 2 and Ti/Pt-layer 3 are sputtered onto a glass substrate 1 (Corning 1737), as described in example 2, and structured. A $PbZr_{0.35}Ti_{0.65}O_3$-layer 4 is deposited on this substrate by using a solution in which lead-acetate-tri-hydrate has been dissolved in 60 g of ethylene glycol monomethylether. A quantity of 8.62 g of titanium-tetran-butylate and 7.51 g of zirconium-tetra-n-butylate are added to this solution. The solution was passed through a cellulose-acetate filter having a pore size of 0.2 µm. To deposit a PZT-layer 4, use is made of the glass substrate 1 with the structured Pt-electrode 3. This substrate is provided with approximately 1 ml of the Pb—Ti—Zr-solution, which is made into a coating by centrifuging at 2500 revolutions per minute. The coating is heated to 600° C. at a rate of 300° C./minute in an oxygen atmosphere and, subsequently, sintered at this temperature.

A second layer of the composition $PbZr_{0.53}Ti_{0.47}O_3$ is provided on this coating. To this end, lead-acetate is dissolved in methoxyethanol. A quantity of 4.204 g of titanium-tetra-n-butylate and 5.076 g of zirconium-tetra-n-butylate are dissolved in methoxyethanol. The titanium- and zirconium-containing solution is added to the lead-acetate solution while stirring. Further, a hydrolyzing solution is prepared from water and concentrated $HNO_3$ and methoxyethanol. This hydrolyzing solution is added to the solution containing lead, titanium and zirconium. The above-mentioned, coated substrate is provided with approximately 1 ml of this Pb—Ti—Zr-solution, which is made into a coating by centrifuging at 2500 revolutions per minute. The coating is heated to 600° C. at a rate of 300° C./minute in an oxygen atmosphere and, subsequently, sintered at this temperature. This process is repeated a number of times. During the last coating process, a heating temperature of 650° C. is used. A Pt-electrode 5 is sputtered onto this PZT-layer 4 and structured by reactive ion etching. The further processing steps leading to the formation of a capacitor component correspond to those described in example 1.

EXAMPLE 4

A thin Ti/Pt-layer 2, 3 comprising 10 nm Ti and 140 nm Pt is sputtered onto a glass substrate 1 (corresponding to the glass substrate described in example 1, 2 or 3). The continuous Pt-electrode 3 is structured by means of a reactive ion-etching process. Subsequently, an anti-reaction layer 2 of $TiO_2$ is formed on the substrate 1 by subjecting the continuous Ti-layer to a thermal treatment at 450° C. in an oxygen flow so as to convert it to a dense $TiO_2$-layer 2. A $PbZr_{0.35}Ti_{0.65}O_3$-layer and a $PbZr_{0.53}Ti_{0.47}O_3$-layer 4, which is doped with La, are provided on this substrate. The preparation of a Pb—La—Ti—Zr-solution takes place in a manner which is similar to the preparation of the solutions described in examples 1, 2, 3. The glass-substrate 1, which is coated, as described above, with an anti-reaction layer 2, is used to deposit the Pb—Ti—Zr and Pb—La—Zr—Ti layers 4. The deposition of the layer structures takes place as described in example 3. A Pt layer is sputtered onto this PZT-layer 4. This upper electrode 5 is structured by means of reactive ion-etching. Subsequently, a protective layer 6 comprising 0.5 µm of $SiO_2$ is applied by means of chemical deposition and structured. The $SiO_2$-layer is provided with a 10 µm thick polymer layer in the form of polyimide and, subsequently, structured. The glass substrate is subdivided into strips. NiCr end contacts 7 are provided by sputtering, and NiPbSn end contacts 7 are grown in an electroplating bath.

EXAMPLE 5

The bottom side of a glass substrate 1 (Schott AF45) is provided with end contacts in a printing process. Subsequently, a thin $ZrO_2$ layer, which serves as the anti-reaction layer 2, is applied to the glass substrate by means of centrifuging. By means of a lift-off method, a thin, structured Ti/Pt layer 2, 3 comprising 10 nm of Ti and 140 nm of Pt is provided on this anti-reaction layer 2. A layer structure 4 of a $PbZr0.35Ti_{0.65}O_3$-layer and a $PbZr_{0.53}Ti_{0.47}O_3$-layer, which is doped with La, is applied to this substrate. The coating process takes place as described in example 4. To manufacture the capacitor, a Pt-layer 6 is provided on the PLZT-layer 4. This upper electrode 5 is structured by means of a lift-off method. Subsequently, a protective layer 6 comprising 0.5 µm of $Si_3N_4$ is deposited by means of PECVD. After structuring of the $Si_3N_4$-layer, an approximately 10 µm thick polyimide layer is provided and structured. After a sub-division into strips, NiCr-end contacts 7 are provided by sputtering. After the complete sub-division into individual products, NiPbSn-end contacts 7 are grown in an electroplating bath.

EXAMPLE 6

The lower side of an $Al_2O_3$-substrate 1 (thick-film quality) is provided with end contacts by means of printing. Subsequently, a lead-silicate layer, which serves as the levelling layer 2, is provided in a further printing process. To this end, a lead-silicate powder is dispersed in isopropanol. Coarse grains are removed by sedimentation. The slurry thus formed is applied to the $Al_2O_3$ substrate 1 by means of a doctor-blade coating process. The substrate is dried and, subsequently, sintered at 900° C. By means of a lift-off method, a thin Ti/Pt-layer 2, 3 comprising 10 nm of Ti and 140 nm of Pt is sputtered onto this levelled substrate 1, 2 and, subsequently, structured. An La-doped $PbZr_{0.53}Ti_{0.47}O_3$-layer 4 is provided on this substrate. The coating process is carried out as described in example 4. To manufacture the capacitor, a Pt-layer 6 is provided on the PLZT-layer 4. This upper electrode 5 is structured by means of a printing process and a lift-off process. Subsequently, a glass layer having a low sintering temperature, which serves as the protective layer 6, is provided by printing. After a sub-division into strips, NiCr-end contacts 7 are provided by sputtering. After the complete sub-division into individual products, NiPbSn-end contacts 7 are grown in an electroplating bath.

What is claimed is:

1. A component comprising a capacitor, including
    at least one substrate layer (1) of glass,
    at least one anti-reaction layer (2) directly on the substrate layer (1),
    wherein the anti-reaction layer (2) is at least one element of a group consisting of $TiO_2$, $ZrO_2$, $HfO_2$, $SrTiO_3$, $CaTiO_3$, $BaTiO_3$, $BaZr_xTi_{1-x}O_3$, wherein x=0 . . . 1, $PbZr_xTi_{1-x}O_3$, wherein x=0 . . . 1, $Ta_2O_5$, $Nb_2O_5$, $MgO$, $BeO$, $Al_2O_3$, $MgAl_2O_4$, $ZrTiO_4$, $BaF_2$, $TiB_2$, $MgF_2$, $Y_2O_3$, $Sc_2O_3$, $La_2O_3$ and $Ln_2O_3$, Ln being a lanthanide,
    a first electrode layer (3) on the anti-reaction layer (2),
    a dielectric layer (4) on the first electrode layer (3),
    a second electrode layer (5) on the dielectric layer (4) and at least two end contacts each having at least 2 surfaces, said surfaces extending over sides of the capacitor, and said contacts are connected to respective first and second electrodes.

2. A component as claimed in claim 1 wherein each of the electrode layers (3, 5) is at least one element of a group consisting of Ti/Pt, Ta/Pt, Ti/Pd/Pt, Ir, $IrO_2$, $IrO_2O_3$, $IrO_2/Ir$, $ZrO_2/Pt$, Ti/Cu, Ti/Ni, Ti/NiAl, Ti/(Ni, Al, Cr), Ti/(Ni, Al, Fe), Ti/(Ni, Fe, Cr), Ti/(Ni, Al, Cr, Fe), Ti/(Ni, Fe, Cr, Si), Ti/(Co, Ni, Fe, Cr), $Pt_xAl_{1-x}$/Pt, $Pt/IrO_2$, $TiO_2/Pt$, conductive oxides, hybrids of at least one conductive oxide and one noble metal, and hybrids of at least one noble metal and one base metal.

3. A component as claimed in claim 1 wherein the dielectric layer (4) is a ferroelectric material having a thickness of 10 nm to 2 µm.

4. A component as claimed in claim 1, further comprising at least one organic or inorganic protective layer (6) atop the second electrode layer (5).

5. A component comprising a capacitor, including
    at least one substrate layer (1) of $Al_2O_3$,
    at least one anti-reaction layer (2) directly on the substrate layer (1),
    wherein the anti-reaction layer (2) consists of non-crystallizing glass consisting of at least one element of a group consisting of $TiO_2$, $ZrO_2$, $HfO_2$, $SrTiO_3$, $CaTiO_3$, $CaZrO_3$, $BaTiO_3$, $BaZr_xTi_{1-x}O_3$, wherein x= 0 . . . 1, $PbZr_xTi_{1-x}O_3$, wherein x=0 . . . 1, $Ta_2O_5$, $Nb_2O_5$, $MgO$, $BeO$, $Al_2O_3$, $MgAl_2O_4$, $ZrTiO_4$, $BaF_2$, $MgF_2$, $Y_2O_3$, $Sc_2O_3$, $La_2O_3$ and $Ln_2O_3$, Ln being a lanthanide,
    a first electrode layer (3) on the anti-reaction layer (2),
    a dielectric layer (4) on the first electrode layer (3), and
    a second electrode layer (5) on the dielectric layer (4).

6. A component as claimed in claim 5 wherein each of the electrode layers (3, 5) is at least one element of a group consisting of Ti/Pt, Ta/Pt, Ti/Pd/Pt, Ir, $IrO_2$, $Ir_2O_3$, $IrO_2$/Ir, $ZrO_2$/Pt, Ti/Cu, Ti/Ni, Ti/NiAl, Ti/(Ni, Al, Cr), Ti/(Ni, Al, Fe), Ti/(Ni, Fe, Cr), Ti/(Ni, Al, Cr, Fe), Ti/(Ni, Fe, Cr, Si), Ti/(Co, Ni, Fe, Cr), $Pt_xAl_{1-x}$/Pt, Pt/$IrO_2$, $TiO_2$/Pt, conductive oxides, hybrids of at least one conductive oxide and one noble metal, and hybrids of at least one noble metal and one base metal.

7. A component as claimed in claim 5 wherein the dielectric layer (4) is a layer of a ferroelectric material having a thickness of 10 nm to 2 $\mu$m.

8. A component as claimed in claim 5 wherein each of the electrode layers (3, 5) is a paste comprising a metal powder selected from the group consisting of $Ag_xPt_{1-x}$, wherein x=0 . . . 1, $Ag_xPd_{1-x}$, wherein x=0 . . . 1, Ag, Cu, Ni, and further comprising an adhesive glass.

9. A component as claimed in claim 5 wherein the dielectric layer (4) comprises a layer of a ferroelectric material having a thickness of 2 $\mu$m to 20 $\mu$m.

10. A capacitor comprising at least one substrate layer (1) of glass, at least one anti-reaction layer (2) on the substrate layer (1), wherein the material used for the anti-reaction layer (2) is at least one element of a group consisting of $TiO_2$, $ZrO_2$, $HfO_2$, $SrTiO_3$, $CaTiO_3$, $BaTiO_3$, $BaZr_xTi_{1-x}O_3$, wherein x=0 . . . 1, $PbZr_xTi_{1-x}O_3$, wherein x=0 . . . 1, $Ta_2O_5$, $Nb_2O_5$, MgO, BeO, $Al_2O_3$, $MgAl_2O_4$, $ZrTiO_4$, $BaF_2$, $MgF_2$, $Y_2O_3$, $Sc_2O_3$, $La_2O_3$ and $Ln_2O_3$, Ln being a lanthanide, a first electrode layer (3) on the anti-reaction layer (2), a dielectric layer (4) on the first electrode layer (3), a second electrode layer (5) on the dielectric layer (4) and at least two end contacts each having at least 2 surfaces, said surfaces extending over sides of the capacitor, and said contacts are connected to respective first and second electrodes.

11. A capacitor comprising at least one substrate layer (1) of $Al_2O_3$, at least one anti-reaction layer (2) directly on the substrate layer (1), wherein the anti-reaction layer (2) consists of non-crystallizing glass consisting of at least one element of a group composed of $TiO_2$, $ZrO_2$, $HfO_2$, $SrTiO_3$, $CaTiO_3$, $CaZrO_3$, $BaTiO_3$, $BaZr_xTi_{1-x}O_3$, wherein x=0 . . . 1, $PbZr_xTi_{1-x}O_3$, wherein x=0 . . . 1, $Ta_2O_5$, $Nb_2O_5$, MgO, BeO, $Al_2O_3$, $MgAl_2O_4$, $ZrTiO_4$, $BaF_2$, $MgF_2$, $Y_2O_3$, $SC_2O_3$, $La_2O_3$ and $Ln_2O_3$, Ln being a lanthanide, a first electrode layer (3) on the anti-reaction layer (2), a dielectric layer (4) on the first electrode layer (3), and a second electrode layer (5) on the dielectric layer (4).

* * * * *